United States Patent
Kuo et al.

(10) Patent No.: US 8,121,229 B2
(45) Date of Patent: Feb. 21, 2012

(54) GUARD SECTION LENGTH DETECTION METHOD AND SYSTEM

(75) Inventors: Chun-Chun Kuo, Hsinchu (TW); Jen-Yuan Hsu, Kinmen County (TW); Chao-Kai Wen, Taipei (TW); Pang-An Ting, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 964 days.

(21) Appl. No.: 11/826,031

(22) Filed: Jul. 11, 2007

(65) Prior Publication Data

US 2008/0019458 A1 Jan. 24, 2008

Related U.S. Application Data

(60) Provisional application No. 60/832,620, filed on Jul. 24, 2006.

(51) Int. Cl.
*H04L 27/06* (2006.01)

(52) U.S. Cl. ........ 375/343; 375/340; 375/342; 375/349; 375/354; 375/360; 370/208; 370/310; 370/513

(58) Field of Classification Search .......... 375/243, 375/295, 292, 316, 260, 342, 343, 354, 359, 375/150, 259, 299, 306, 219, 271, 286, 291, 375/322, 327, 345, 350, 355, 371; 370/208, 370/310, 513, 350

See application file for complete search history.

(56) References Cited

U.S. PATENT DOCUMENTS

| | | | |
|---|---|---|---|
| 6,363,084 B1 | 3/2002 | Dejonghe | |
| 6,449,245 B1 | 9/2002 | Ikeda et al. | |
| 6,539,063 B1 | 3/2003 | Peyla et al. | |
| 6,922,388 B1 | 7/2005 | Laroia et al. | |
| 6,928,048 B1 | 8/2005 | Do et al. | |
| 7,012,881 B2 | 3/2006 | Kim | |
| 7,627,020 B2* | 12/2009 | Demir et al. | 375/145 |
| 7,688,864 B2* | 3/2010 | Zeng et al. | 370/513 |
| 2002/0186791 A1 | 12/2002 | Foxcroft et al. | |
| 2004/0106386 A1 | 6/2004 | Doi | |
| 2004/0223554 A1 | 11/2004 | Cha | |
| 2005/0008088 A1* | 1/2005 | Liu et al. | 375/260 |
| 2005/0099936 A1* | 5/2005 | Fujii et al. | 370/203 |
| 2005/0147187 A1 | 7/2005 | Mori | |
| 2005/0226350 A1* | 10/2005 | Goto | 375/317 |
| 2005/0265488 A1 | 12/2005 | Jung | |
| 2006/0067412 A1 | 3/2006 | Qiu et al. | |
| 2006/0215779 A1* | 9/2006 | Shiina | 375/260 |
| 2007/0047433 A1* | 3/2007 | Kao | 370/208 |
| 2009/0028220 A1* | 1/2009 | Roh et al. | 375/136 |
| 2009/0304126 A1* | 12/2009 | Sahara | 375/343 |

FOREIGN PATENT DOCUMENTS

| | | |
|---|---|---|
| TW | I253819 B | 4/2006 |
| TW | 200623756 A | 7/2006 |

* cited by examiner

*Primary Examiner* — Hirdepal Singh (74) *Attorney, Agent, or Firm* — Birch, Stewart, Kolasch & Birch, LLP (57) ABSTRACT

A guard section length detection method detects whether a preamble signal is received. A short preamble boundary is then detected, then detecting a frame boundary and detecting a guard section length. In the step of detecting the guard section length a second matched filter capable of processing 128 point data sets is detected. Four different 128 point data sets have a distance of 8 points, 16 points, 32 points, and 64 points respectively from the frame boundary to the second matched filter. Four signal correlation values are calculated for determining the guard section length.

32 Claims, 10 Drawing Sheets

GUARD SECTION LENGTH DETECTION METHOD AND SYSTEM

BACKGROUND OF THE INVENTION

1. Field of the Invention

The invention relates to a guard section length detection method, and more particularly to a guard section length detection method based on the preamble signals.

2. Description of the Related Art

Compared with the conventional single carrier communication system, the OFDM communication system allocates data in several subcarriers, thus, the data transmission speed can be increased. Because the OFDM system is increasingly being used in wireless communication systems, a guard section is used to reduce inter-symbol interference (ISI). Inter-symbol interference (ISI) is a form of signal distortion that causes previously transmitted symbols to have an effect on the currently received symbol. Adding the guard section reduces ISI, however, because it does not carry information, transmission speed is also reduced. If the OFDM symbol length is $N_{FFT}$ points and the guard section length is $N_{GI}$ points, for example, the transmission rate after adding the guard section is $$\frac{N_{FFT}}{N_{FFT} + N_{GI}}$$

of the transmission rate without an added guard section. ISI can typically be prevented when the guard section is longer than the channel length and a longer guard section length decreases the transmission rate, and OFDM system performance does not improve.

Because the selection of the length of the guard interval depends on the channel condition, the guard interval length changes dynamically. For example, the IEEE 802.16 standard defines a guard section length of ¼, ⅛, 1/16 or 1/32 (hereafter referred to as a ¼ mode, ⅛ mode, 1/16 mode and 1/32 mode) of an actual OFDM symbol length, and the base station selects a proper guard section length based on the channel length and the environment. Thus, a method for synchronizing the guard section parameter between the transmitters and receivers is desirable.

BRIEF SUMMARY OF THE INVENTION

A guard section length detection method is disclosed. An exemplary embodiment of a guard section length detection method comprises: detecting whether or not the preamble signal is received; detecting a short preamble boundary; detecting a frame boundary and detecting a guard section length.

In one aspect of the invention, step of detecting the guard section length comprises selecting a second matched filter capable of processing 128 point data sets; transmitting four different 128 point data sets at a distance of 8 points, 16 points, 32 points, and 64 points from the frame boundary to the second matched filter respectively; finally calculating four signal correlation values and determining the guard section length based on the signal correlation values.

In another aspect of the invention, step of detecting a guard section length comprises defining a reference signal; defining four different matched filters based on the reference signal; and calculating four signal correlation values and determining the guard section length based on the signal correlation values.

The invention also provides an OFDM system receiving a signal for detecting the guard section length, comprising a preamble signal detection unit, a short preamble boundary detection unit, a frame boundary detection unit and a guard section length detection unit. The preamble signal detection unit receives the signal to detect whether or not a preamble signal is received. The short preamble boundary detection unit detects a position of a short preamble boundary. The frame boundary detection unit detects a position of a frame boundary. The guard section length detection unit detects a guard section length of the received signal.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is one of the best-contemplated mode of carrying out the invention. This description is made for the purpose of illustrating the general principles of the invention and should not be taken in a limiting sense. The scope of the invention is best determined by reference to the appended claims.

Figure 1:
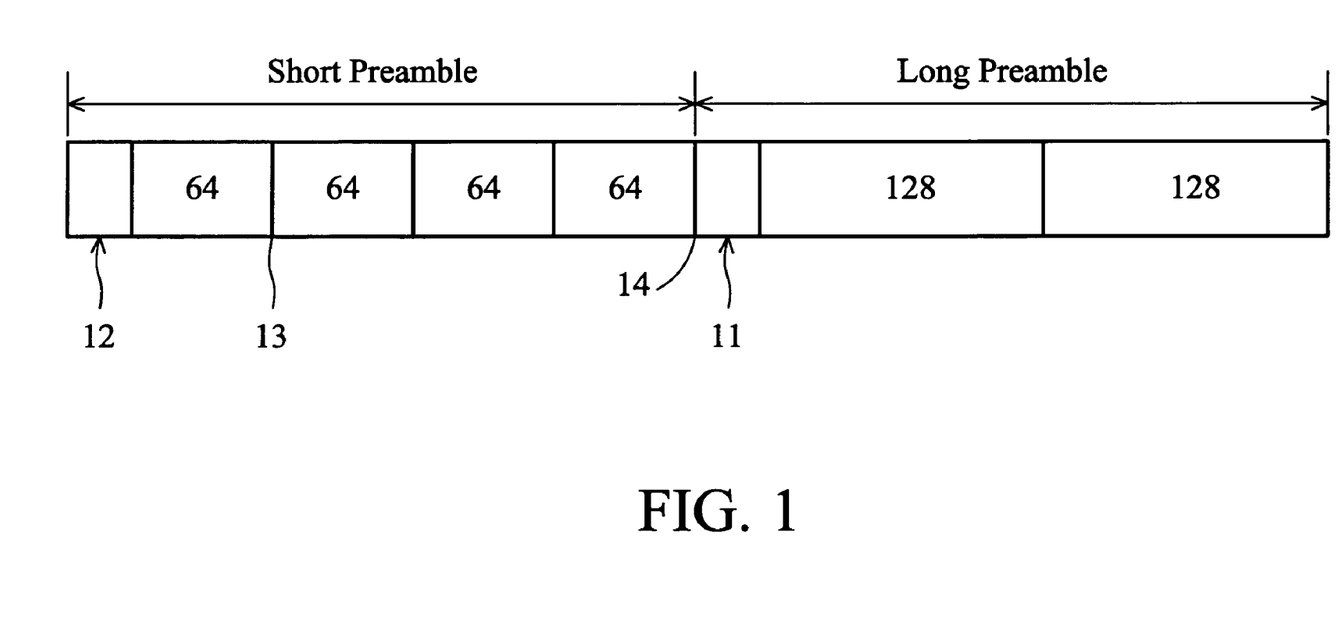
FIG. 1 is a schematic diagram of a preamble structure of the 802.16-2004 standard.

Take 802.16-2004 standard as an example. FIG. 1 is a schematic diagram of a preamble structure in the 802.16-2004 standard. The preamble signal comprises a short preamble comprising four repeated 64-point signals, a long preamble comprising two repeated 128-point signals, and a guard section 11 interposed between the short preamble and the long preamble. A guard section 12 is also interposed between two preamble signals. The length of the guard section is variable in the OFDM system. The base station selects a correct guard section length based on the channel length and dynamic environmental effects. For example, in an OFDM system conforming to the 802.16-2004 standard, the length of the guard section is 8 points, 16 points, 32 points or 64 points respectively corresponding to the 1/32 mode, 1/16 mode, ⅛ mode and ¼ mode.

Figure 2:
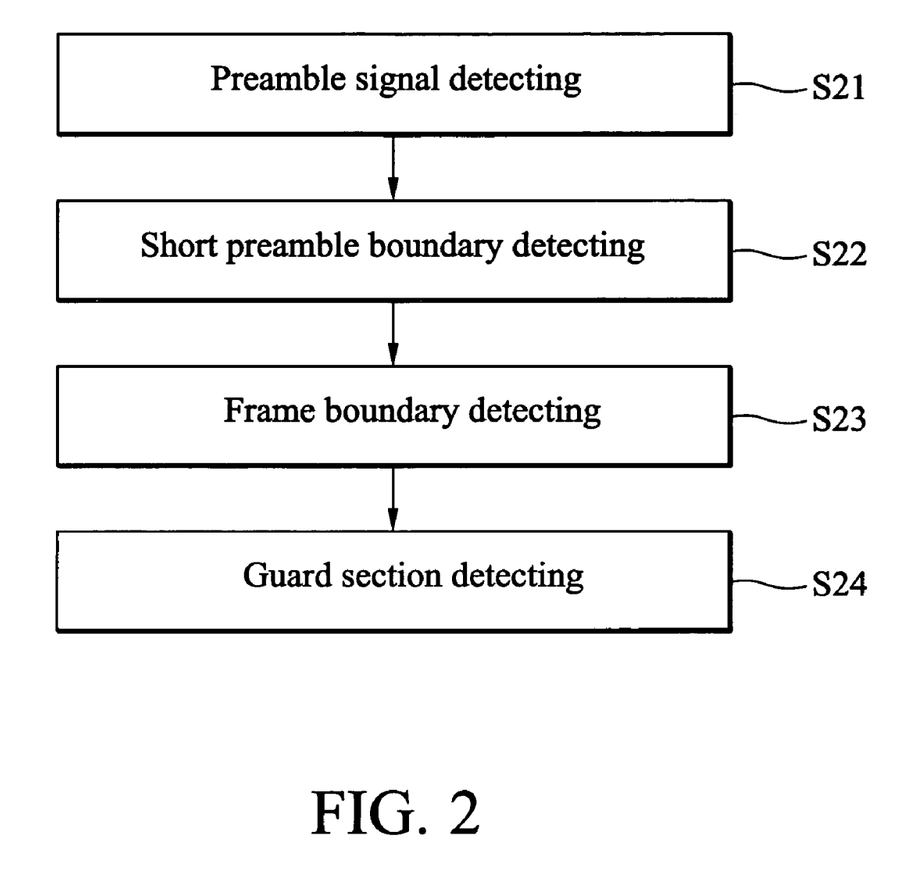
FIG. 2 is a flow chart of an embodiment of the guard section length detection method.

FIG. 2 is a flow chart of an embodiment of the guard section length detection method. Take 802.16-2004 standard as an example. The guard section length detection method requires at least two preamble signals for implementation, thus, the first step (step S21) detects whether the preamble signal is received. After receiving the preamble signal, a boundary detection procedure is applied to detect a short preamble boundary, such as the boundary 13 in FIG. 1, in step S22. The short preamble boundary is determined by a maximum signal correlation value calculated by a first matched filter (MF) capable of processing a 64 point data set. In step S23, the first matched filter determines a frame boundary, such as the boundary 14 in FIG. 1. In step S24, a guard section length detection procedure is performed, detecting the guard section length by a second matched filter capable of processing a 128 point data set.

For further illustration, please refer to FIGS. 3 to 7. In step S21 the preamble signal is detected in response to turn on of the OFDM system. Step S21 is implemented by the following expressions:

$$c(n) = \sum_{k=n}^{n+D-1} \tilde{r}*(k+D)\tilde{r}(k), c(n) = 0 \text{ for } n < n_{AGC} + D$$

$$p(n) = \sum_{k=n}^{n+D-1} |\tilde{r}(k+D)|^2$$

$$m_p = \frac{|c(n)|^2}{(p(n))^2},$$

where r(k) is the received signal, c(n) is the signal correlation of r(k), p(n) is the energy of r(k), D is the length of the short preamble, and in IEEE 802.16-2004 standard, D is 64. When $m_p$ exceeds a predetermined value, such as 0.5, the OFDM system has received the preamble signal. In some embodiments, the predetermined value can be any positive number less than 1. When $m_p$ exceeds the predetermined value, a reference boundary, such as the boundary 31, is recorded. A short matched filter, such as the first matched filter in FIG. 2, receives the preamble signal and calculates a signal correlation value when the short matched filter receives new data. For example, suppose the short matched filter processes a 64 point data set, the short matched filter processes the data s(n) to s(n+63) to calculate a signal correlation value, and the short matched filter then processes the data s(n+1) to s(n+64) in the next cycle, wherein s(n) is the preamble signal. In this embodiment, the function of the short matched filter can be defined by the short preamble signal shown as the following equation:

$$h_{short}(n)=s(64-n), n=0, 1, 2, 3 \ldots 63,$$

where s(n) represents the short preamble signal.

In this embodiment, the short matched filter calculates 64 signal correlation values, and the short preamble boundary, such as the boundary 32, occurs at the position that the corresponding signal correlation value is the maximum value. Furthermore, the length of the short matched filter can be less than 64 points, i.e., the short matched filter can processes data less than 64 points, and the data processed by the short matched filter can be the quantized data or sampled data in order to reduce complexity. To reduce the complexity of circuit for the short preamble boundary search, 64 point matched filter is preferred but not to limit the invention thereto.

Figure 4:
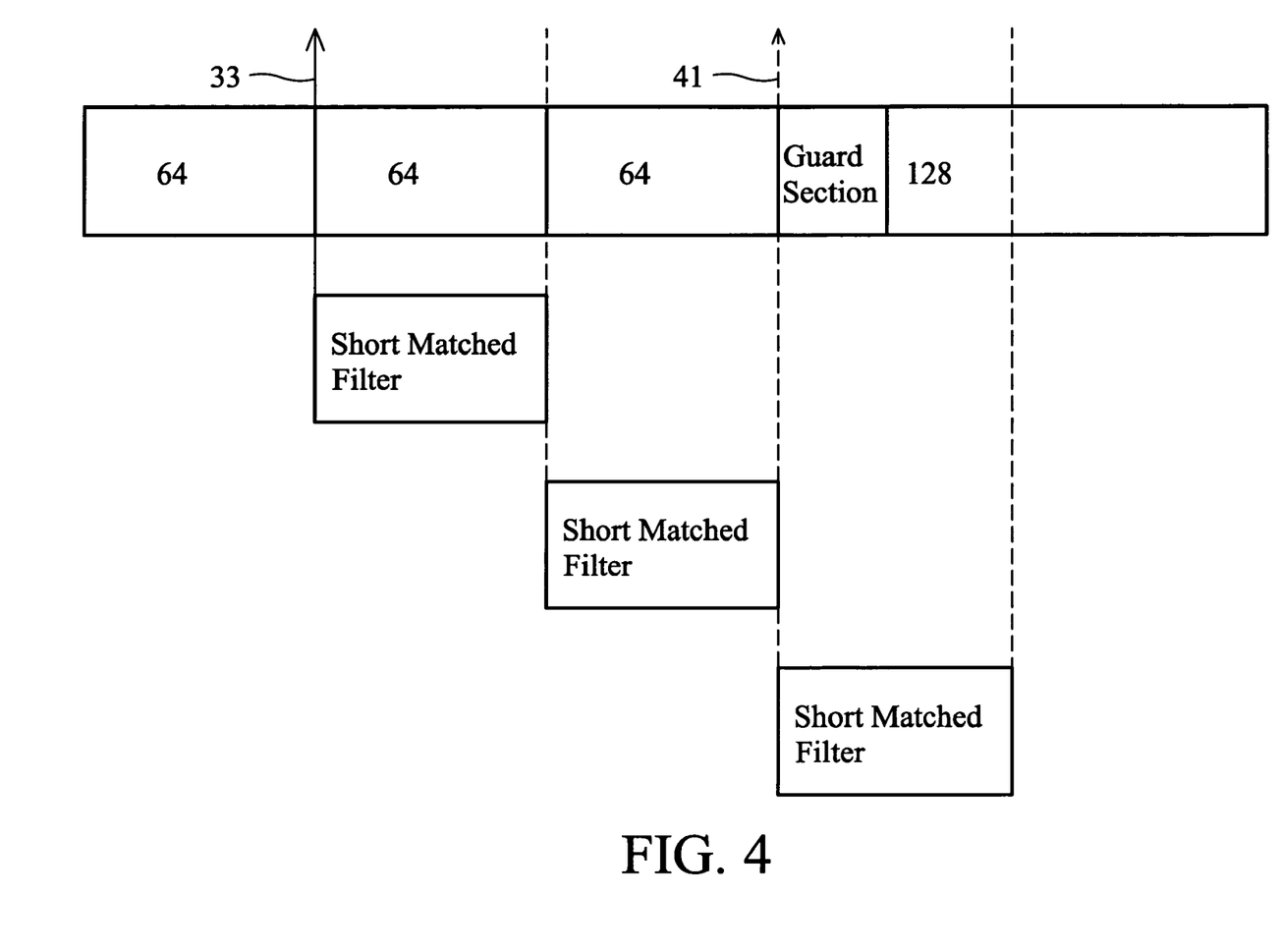
FIG. 4 is a schematic diagram of an embodiment of step S23 of detecting the frame boundary.

When the short preamble boundary is detected, the short matched filter calculates the signal correlation value after receiving 64 point data set. Detection of the frame boundary (step S23) is schematically illustrated in FIG. 4. A ratio of the signal correlation value to the previous signal correlation value less than a predetermined value, such as 0.5, indicates that the short preamble signal is completely transmitted, and the frame boundary 41 can be detected based on the signal correlation value.

Figure 5:
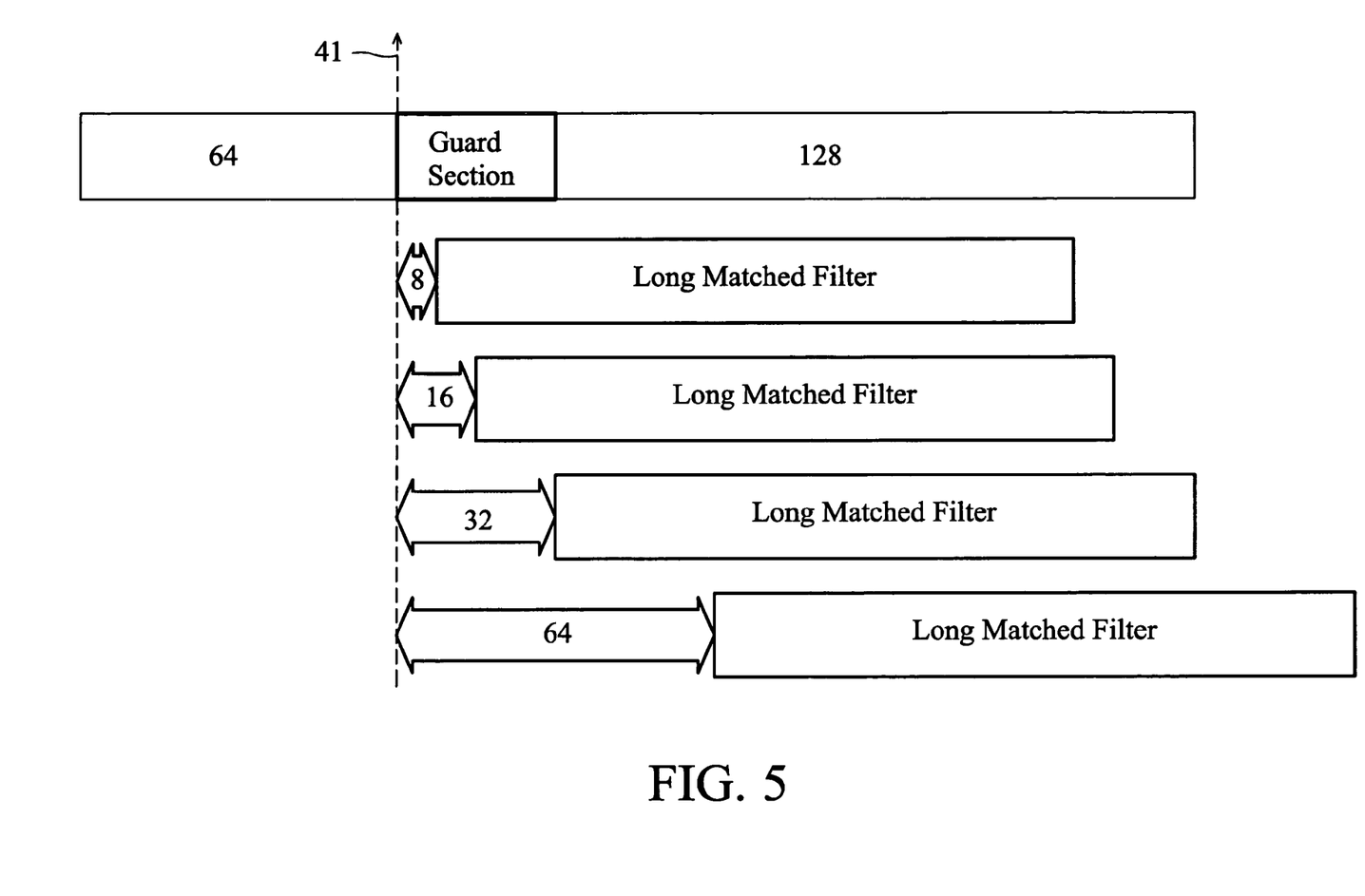
FIG. 5 shows a schematic diagram of an embodiment of guard section length detection method of the invention.

When the frame boundary is detected, the procedure begins detecting the guard section length. Please refer to FIG. 5. FIG. 5 shows a schematic diagram of an embodiment of guard section length detection method of the invention. In this embodiment, a long matched filter, such as the second filter described in FIG. 2, is utilized for guard section length detection. The function of the long matched filter can be defined by the short preamble signal shown as the following equation:

$$h_{long}(n)=L(128-n), n=0, 1, 2, 3 \ldots 127$$

where L(n) represents the long preamble signal.

The long matched filter respectively receives four different 128 point data sets having a distance of 8 points, 16 points, 32 points, and 64 points respectively from the frame boundary 41 to calculate corresponding signal correlation values. If the signal transmitted to the long matched filter is r(n) and the data at the frame boundary is r(0), the four different 128 point data sets transmitted to the long matched filter are [r(8), r(9) . . . r(135)], [r(16), r(17) . . . r(143)], [r(32), r(33) . . . r(159)], and [r(64), r(65) . . . r(191)] respectively. The long matched filter determines four signal correlation values, and a threshold value is determined based on a maximum signal correlation value among the four signal correlation values. The threshold is the product of the maximum signal correlation value and a positive number less than 1. In this embodiment, the threshold is the product of the maximum signal correlation value and 0.75.

Figure 6:
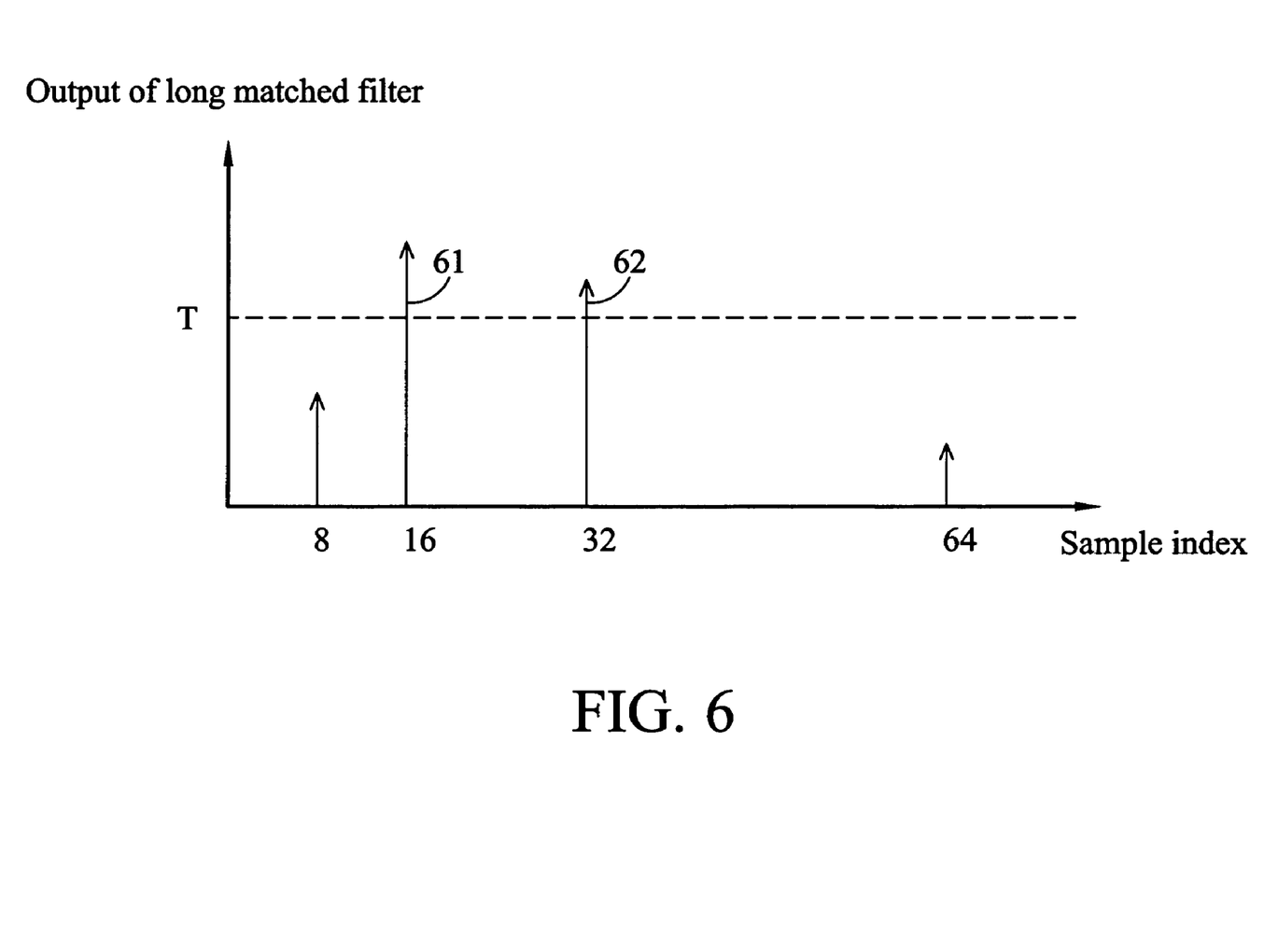
FIG. 6 is schematic diagram of an output of the long matched filter.
Figure 7:
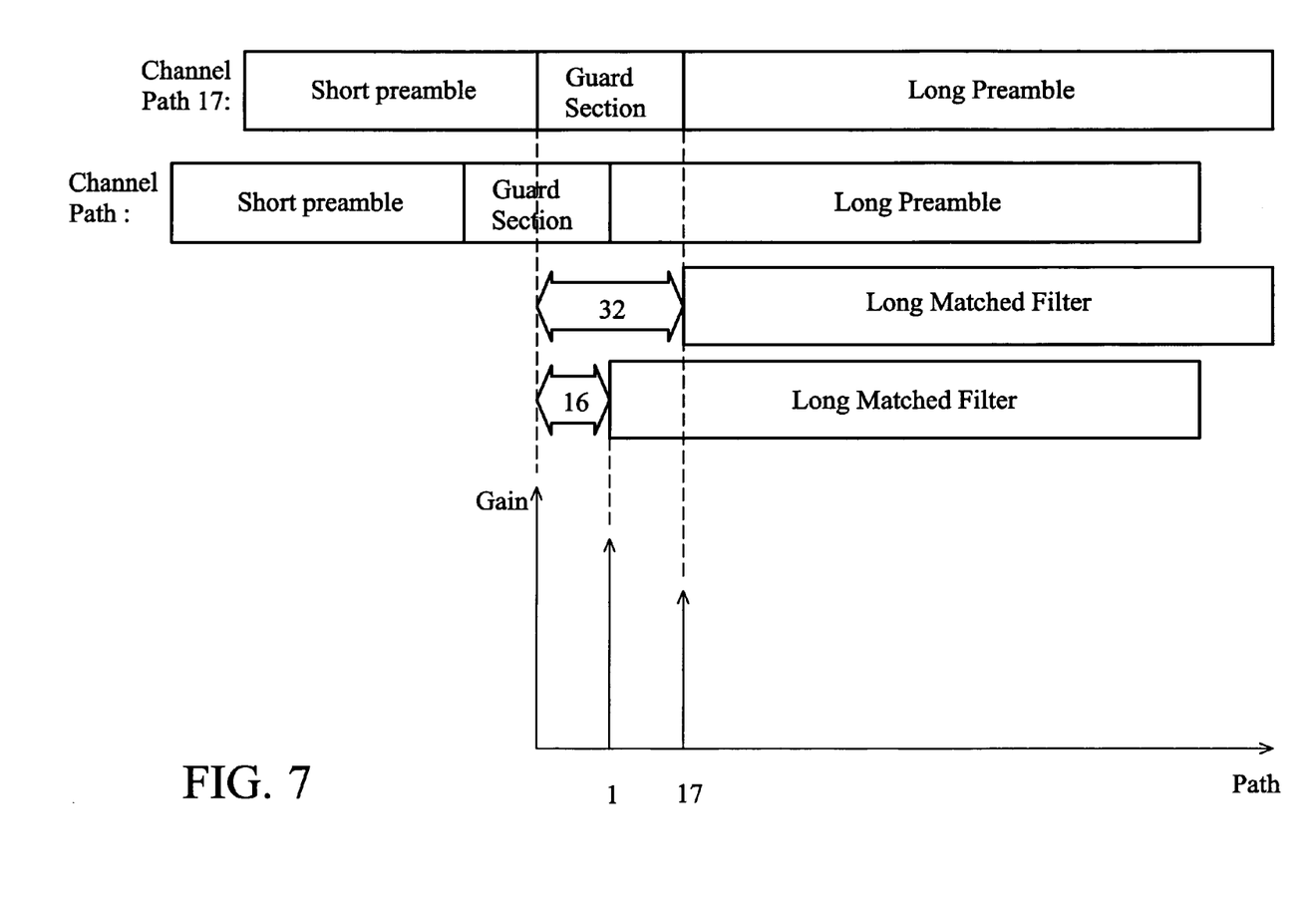
FIG. 7 shows a schematic diagram of channel path interference in the NLOS channel path mode.

FIG. 6 is schematic diagram of an output of the long matched filter. In FIG. 6, two outputs of the long matched filter exceed the threshold T. The two outputs of the long matched filter, 61 and 62, exceeding the threshold T respectively correspond to the 32 point guard section length and 16 point guard section length, however, the actual guard section length is 32 points and extreme signal correlation value 61 is generated due to the NLOS (non line of sight) channel path. In the AWGN (additive white Gaussian noise) or the LOS (line of noise) channel path mode, the number of the signal correlation value exceeding the threshold T is typically 1, thus, the guard section length is determined by the signal correlation value exceeding the threshold. In the NLOS (non line of noise) channel path mode, however, the number of the signal correlation value exceeding the threshold may exceed 1, and only the maximum guard section length is the actual guard section length. For example, if the signal correlation values corresponding to guard section length of 16 points and 32 points exceed the threshold, the actual guard section length is 32 points. Further illustration is provided in FIG. 7. FIG. 7 shows a schematic diagram of channel path interference in the NLOS channel path mode. In FIG. 7, both the channel paths 1 and 17 have large channel gain. If the frame boundary determined in step S23 of FIG. 2 is the frame boundary of the channel path 17, the output signal correlation value indicates that the guard section length is 32 points. If the frame boundary determined in step S23 of FIG. 2 is the frame boundary of the channel path 1, the signal correlation value indicates that the guard section length is 16 points due to the difference between the channel paths 1 and 17 being equal to 16(17−1=16). Thus, if there is greater than one signal correlation value exceeding the threshold, the maximum guard section length among the guard section lengths corresponding to the signal correlation values exceeding the threshold is the actual guard section length.

Figure 8:
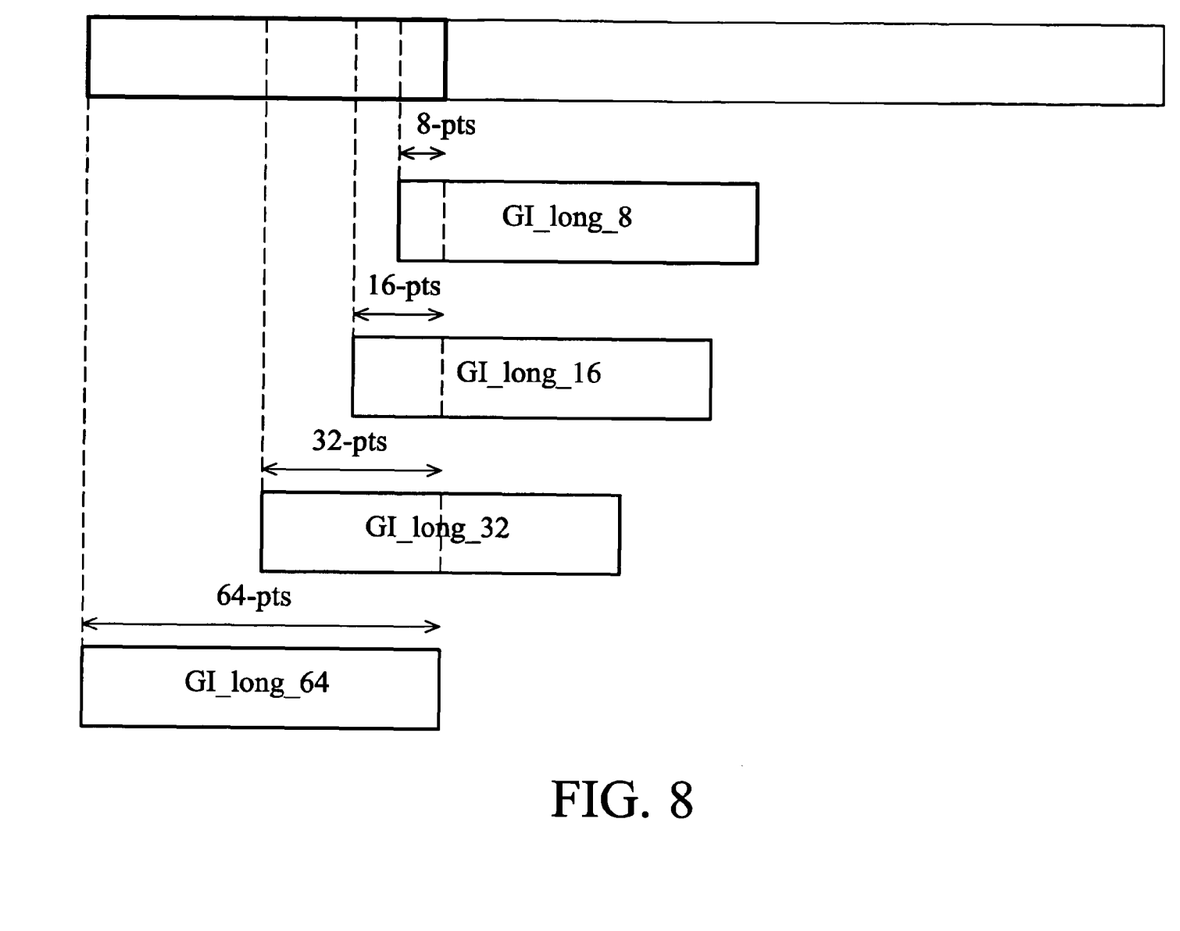
FIG. 8 shows a schematic diagram of an embodiment of defining four matched filters for the guard section length detection method of the invention.

FIG. 8 shows a schematic diagram of an embodiment of defining four matched filters for the guard section length detection method of the invention. In this embodiment, four matched filters are utilized for detecting the guard section length. A reference signal $L_{ref}(n)$ is defined as following for the four matched filter.

$$L_{ref}(n)=[L(64),L(65),\ldots,L(127),L(0),L(1),\ldots,L(63)],$$

The reference signal $L_{ref}(n)$ comprises the first 64 point data set of the long preamble and 64 point guard section data. The functions of the four matched filters are defined as the following, $$h_{GI\_long\_8}(n)=[L_{ref}(56), L_{ref}(57),\ldots,L_{ref}(119)],$$

$$h_{GI\_long\_16}(n)=[L_{ref}(48), L_{ref}(49),\ldots,L_{ref}(111)],$$

$$h_{GI\_long\_32}(n)=[L_{ref}(32), L_{ref}(33),\ldots,L_{ref}(95)],$$

$$h_{GI\_long\_64}(n)=[L_{ref}(0)\ L_{ref}(1),\ldots,L_{ref}(63)].$$

Figure 9:
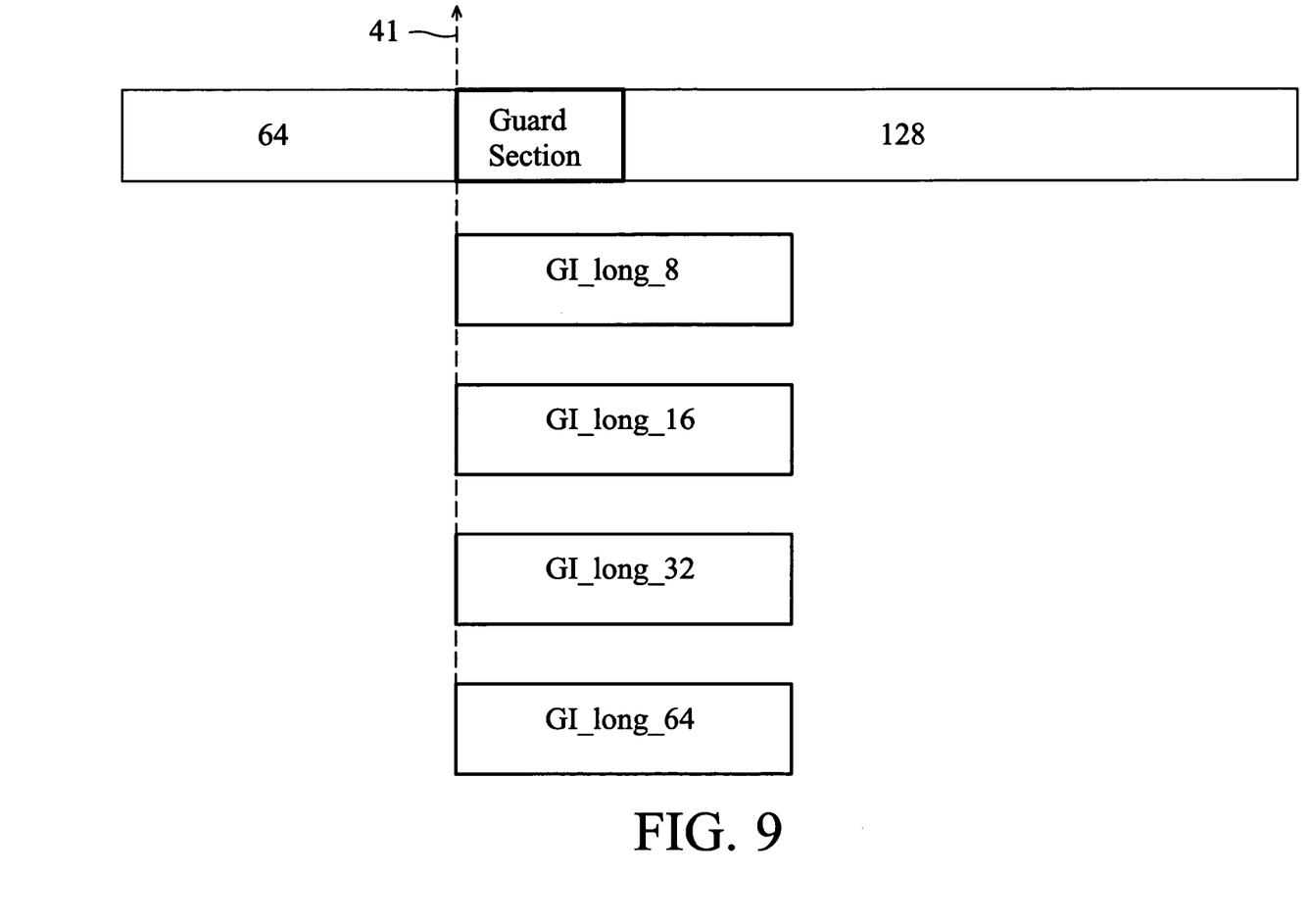
FIG. 9 shows a schematic diagram of another embodiment of guard section length detection method of the invention.

The four matched filters are utilized to calculate four signal correlation values based on the frame boundary, as shown in FIG. 9. In FIG. 9, a threshold is determined based on the four signal correlation values. The threshold value is determined based on a maximum signal correlation value among the four signal correlation values. The threshold is the product of the maximum signal correlation value and a positive number less than 1. In this embodiment, the threshold is the product of the maximum signal correlation value and 0.75. In the invention, the threshold is a relative value, thus, the effects of SNR (signal to noise ratio) and the channel path model can be reduced.

Figure 10:
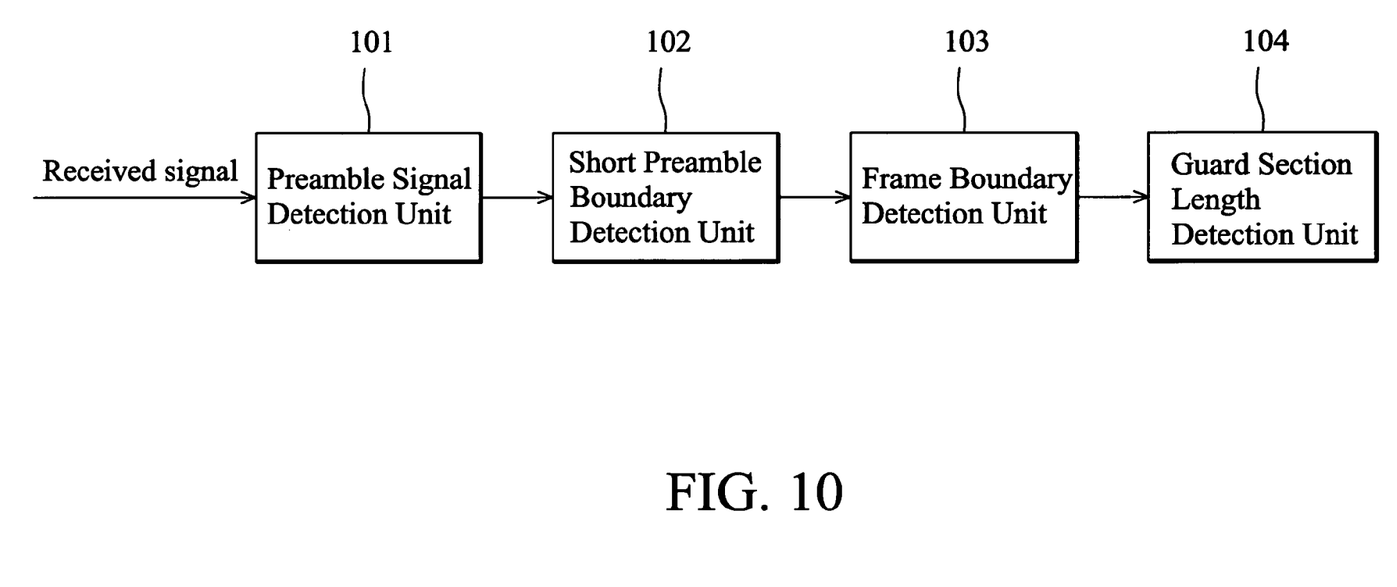
FIG. 10 is a block diagram of an embodiment of a guard section length detection system of the invention.

FIG. 10 is a block diagram of an embodiment of a guard section length detection system of the invention; The received signal comprises a preamble signal and a data signal, the preamble signal further comprises short preambles, long preambles, and a guard section interposed between the short preambles and the long preambles. The preamble signal detection unit 101 operates in response to turn on of the guard section length detection system. The preamble signal detection unit 101 detects whether the preamble signal is received. The operation of the preamble signal detection unit 101 can be expressed by the following equations:

$$c(n) = \sum_{k=n}^{n+D-1} \tilde{r}*(k+D)\tilde{r}(k),\ c(n) = 0\text{ for }n < n_{AGC} + D$$

$$p(n) = \sum_{k=n}^{n+D-1} |\tilde{r}(k+D)|^2$$

$$m_p = \frac{|c(n)|^2}{(p(n))^2},$$

where $r(k)$ is the received signal, $c(n)$ is the signal correlation of $r(k)$, $p(n)$ is the energy of $r(k)$, D is the length of the short preamble, and in the IEEE 802.16-2004 standard, and D is 64. When $m_p$ exceeds a predetermined value, such as 0.5, the OFDM system has received the preamble signal. In other embodiments, the predetermined value can be any positive number less than 1.

After the preamble signal has been received, the short preamble boundary detection unit 102 receives the output signal of the preamble signal detection unit 101 and detects the short preamble boundary. When $m_p$ exceeds the predetermined value, a reference boundary, such as the boundary 31, is recorded. A short matched filter, such as the first matched filter in FIG. 3, receives the preamble signal and calculates a signal correlation value when the short matched filter receives new data. For example, suppose the short matched filter processes a 64 point data set, the short matched filter processes the data $s(n)$ to $s(n+63)$ to calculate a signal correlation value, and the short matched filter then processes the data $s(n+1)$ to $s(n+64)$ in the next cycle, wherein $s(n)$ is the preamble signal. In this embodiment, the function of the short matched filter can be defined by the short preamble signal shown as the following equation:

$$h_{short}(n)=s(64-n), n=0, 1, 2, 3 \ldots 63,$$

where $s(n)$ represents the short preamble signal.

Figure 3:
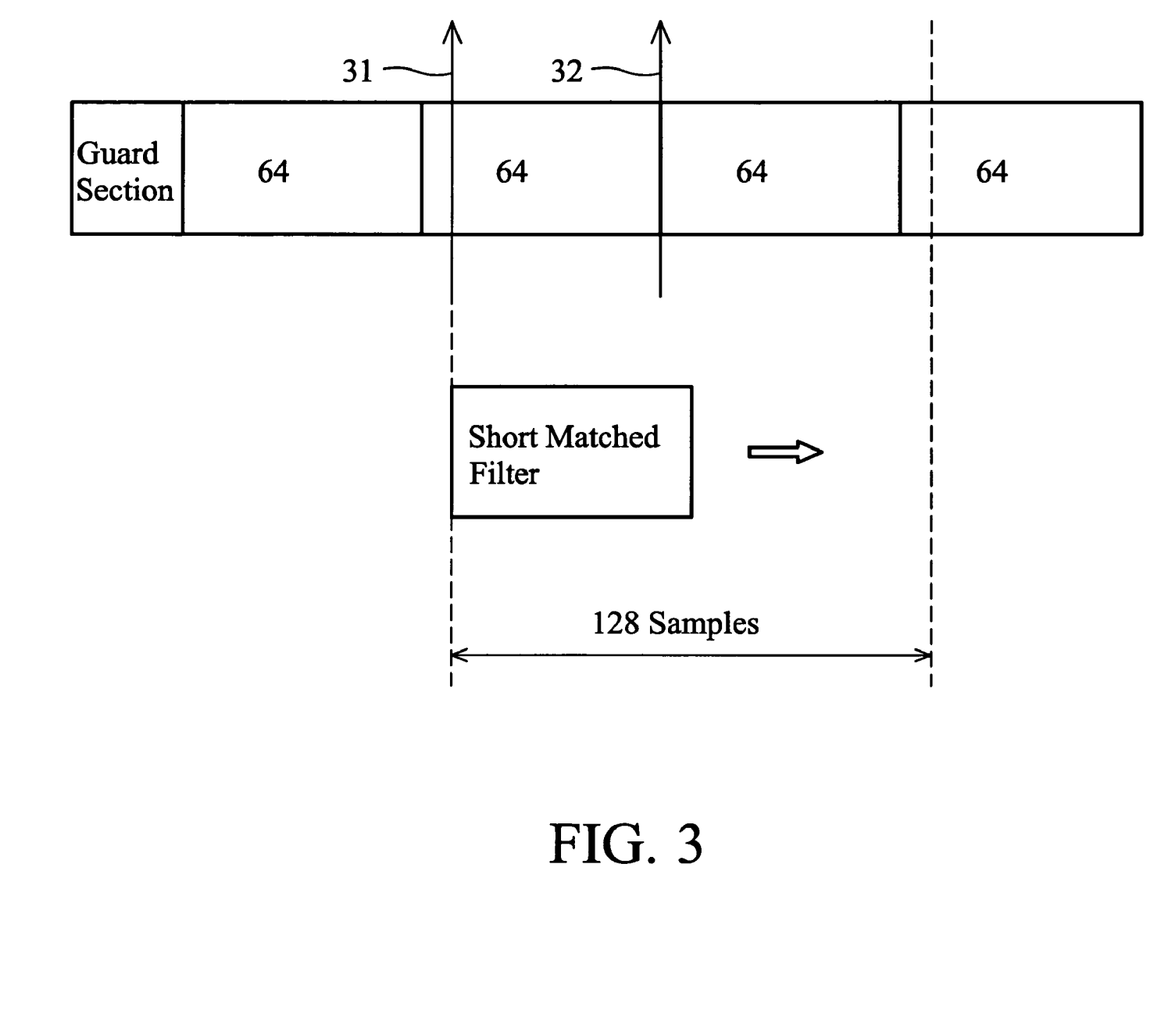
FIG. 3 is a schematic diagram of an embodiment of step of detecting the short preamble boundary.

A short matched filter, such as the first matched filter in FIG. 3, receives the preamble signal and calculates a signal correlation value when the short matched filter receives new data. In this embodiment, the short matched filter calculates 64 signal correlation values, and the short preamble boundary occurs at the position that the corresponding signal correlation value is the maximum value. Furthermore, the length of the short matched filter can be not 64 points, i.e., the short matched filter can processes data not with 64 points, and the data processed by the short matched filter can be the quantized data or sampled data in order to reduce complexity. To reduce the complexity of circuit for the short preamble boundary search, 64-point matched filter is preferred but not to limit the invention thereto.

The frame boundary detection unit 103 comprises a matched filter capable of processing 64 point data set. The matched filter then calculates the signal correlation value after receiving 64 point data set based on the short symbol boundary. When the ratio of the signal correlation value to the previous signal correlation value is less than a predetermined value, such as 0.5, the short preamble signal is completely transmitted, thus, the frame boundary can be determined.

When the frame boundary is determined, the guard section length detection unit 104 detects the guard section length. The guard section length detection unit 104 comprises a second matched filter capable of processing a 128 point data set. Operation of the guard section length detection unit 104 is disclosed in FIGS. 5 to 9, and thus is not described again for brevity. Furthermore, the length of the second matched filter can be not 128 points, i.e., the second matched filter can processes data not with 128 points, and the data processed by the second matched filter can be the quantized data or sampled data in order to reduce complexity. To reduce the complexity of circuit for guard section length detection, 128-point matched filter is preferred but not to limit the invention thereto.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A guard section length detection method, comprising:
    detecting whether a preamble signal is received;
    detecting a short preamble boundary;

detecting a frame boundary; and
detecting a guard section length,
wherein the step of detecting a guard section length comprises:
from a first and a second matched filters, selecting the second matched filter;
transmitting N different data sets having different distances respectively from the frame boundary to the second matched filter; and
calculating N signal correlation values and determining the guard section length based on the signal correlation values,
wherein the second matched filter is capable of processing 128 point data sets, N is equal to four, the transmitting step comprises transmitting four different 128 point data sets having a distance of 8 points, 16 points, 32 points, and 64 points respectively from the frame boundary to the second matched filter, and the calculating step comprises calculating four signal correlation values.

2. The method as claimed in claim 1, wherein the step of detecting the preamble signal comprises:
calculating a signal correlation value of a received signal;
calculating an energy of the received signal; and
determining whether the preamble signal being received according to a ratio of the signal correlation value to the energy exceeding a predetermined value.

3. The method as claimed in claim 2, wherein the predetermined value is less than 1.

4. The method as claimed in claim 2, wherein the predetermined value is greater than 0.5 and less than 0.75.

5. The method as claimed in claim 1, wherein the short preamble boundary is determined by the first matched filter.

6. The method as claimed in claim 5, wherein the first matched filter is capable of processing 64 point data sets.

7. The method as claimed in claim 1, wherein a frame preamble boundary is determined in response to a ratio of a present signal correlation value to a previous signal correlation value less than a predetermined value.

8. The method as claimed in claim 7, wherein the predetermined value is 0.5.

9. The method as claimed in claim 1, further comprising:
determining a threshold based on a maximum signal correlation value; and
determining the guard section length based on at the signal correlation value exceeding the threshold.

10. The method as claimed in claim 9, wherein the threshold is a product of the maximum signal correlation value and a positive number less than 1.

11. The method as claimed in claim 9, wherein the threshold is a product of the maximum signal correlation value and 0.75.

12. The method as claimed in claim 9, wherein if there is greater than one signal correlation value exceeding the threshold, the maximum guard section length among guard section lengths corresponding to the signal correlation value exceeding the threshold is the actual guard section length.

13. The method as claimed in claim 1, wherein the step of detecting a guard section length comprises:
defining a reference signal;
defining N different matched filters based on the reference signal; and
calculating N signal correlation values and determining the guard section length based on the signal correlation values.

14. The method as claimed in claim 13, wherein N is four.

15. The method as claimed in claim 13, wherein the reference signal references to the preamble signal.

16. The method as claimed in claim 13, wherein the reference signal is a 128 point signal comprising a first 64 point data set of a long preamble signal and a 64 point guard section data set.

17. The method as claimed in claim 13, further comprising:
determining a threshold based on a maximum signal correlation value; and
determining the guard section length based on the signal correlation value exceeding the threshold.

18. The method as claimed in claim 17, wherein the threshold is a product of the maximum signal correlation value and a positive number less than 1.

19. The method as claimed in claim 17, wherein the threshold is a product of the maximum signal correlation value and 0.75.

20. The method as claimed in claim 17, wherein if there is greater than one signal correlation value exceeding the threshold, the maximum guard section length among guard section lengths corresponding to the signal correlation value exceeding the threshold is the actual guard section length.

21. An OFDM system receiving a signal, comprising:
a preamble signal detection circuit receiving the signal to detect whether a preamble signal has been received;
a short preamble boundary detection circuit to detect a short preamble boundary;
a frame boundary detection circuit to detect a frame boundary; and
a guard section length detection circuit to detect a guard section length of the received signal,
wherein from a first and a second matched filters, the guard section length detection circuit comprises the second matched filter, N different data sets having different distances respectively from the frame boundary are transmitted to the second matched filter, N signal correlation values are calculated and the guard section length is determined based on the signal correlation values,
wherein the second matched filter is capable of processing 128 point data sets, N is equal to four, the four different data sets having a distance of 8 points, 16 points, 32 points, and 64 points respectively from the frame boundary are transmitted to the second matched filter, and the four signal correlation values are calculated and the guard section length is determined based on the signal correlation values.

22. The system as claimed in claim 21, wherein the preamble signal detection circuit calculates a signal correlation value and an energy of the received signal, and determines whether the preamble signal being received according to a ratio of the signal correlation value to the energy exceeding a predetermined value.

23. The system as claimed in claim 21, wherein the short preamble boundary detection circuit comprises the first matched filter.

24. The system as claimed in claim 21, wherein the short preamble boundary detection circuit comprises the first matched filter capable of processing 64 point data sets.

25. The system as claimed in claim 21, wherein the first matched filter calculates a plurality of signal correlation values and a position with a maximum signal correlation value among the signal correlation values is deemed as the short preamble boundary.

26. The system as claimed in claim 21, wherein the frame boundary is detected in response to a ratio of a present signal correlation value to a previous signal correlation value less than a predetermined value.

27. The system as claimed in claim 21, wherein the second matched filter calculates a plurality of signal correlation values and the guard section length is determined based on one signal correlation value exceeding a threshold.

28. The system as claimed in claim 27, wherein if there is greater than one signal correlation value exceeding the threshold, the maximum guard section length among guard section lengths corresponding to the signal correlation value exceeding the threshold is the actual guard section length.

29. The system as claimed in claim 21, wherein the guard section length detection circuit comprises N second matched filters. N second matched filters are defined based on a reference signal; and N signal correlation values are calculated and the guard section length is determined based on the signal correlation values.

30. The system as claimed in claim 29, wherein the reference signal references to the preamble signal.

31. The system as claimed in claim 29, further comprising:
determining a threshold based on a maximum signal correlation value; and
determining the guard section length based on the signal correlation value exceeding the threshold.

32. The system as claimed in claim 31, wherein if there is greater than one signal correlation value exceeding the threshold, the maximum guard section length among guard section lengths corresponding to the signal correlation value exceeding the threshold is the actual guard section length.

* * * * *